United States Patent [19]

Sprague et al.

[11] 4,370,029

[45] Jan. 25, 1983

[54] DIELECTRIC INTERFACE FOR PROXIMITY COUPLED ELECTRO-OPTIC DEVICES

[75] Inventors: Robert A. Sprague, Saratoga; William D. Turner, San Marino; David H. Hartke, Los Angeles, all of Calif.

[73] Assignee: Xerox Corporation, Stamford, Conn.

[21] Appl. No.: 187,919

[22] Filed: Sep. 17, 1980

[51] Int. Cl.³ ............................................. G02F 1/01
[52] U.S. Cl. .................................. 350/355; 350/353; 350/356; 350/357; 350/358
[58] Field of Search ......................... 350/353, 355–358

[56] References Cited

U.S. PATENT DOCUMENTS 3,958,862  5/1976  Scibor-Rylski ............... 350/356
4,125,318  11/1978  Scibor-Rylski ............... 350/356
4,281,904  8/1981  Sprague et al. ............... 350/356

Primary Examiner—William L. Sikes
Assistant Examiner—Léon Scott, Jr.

[57] ABSTRACT

The gap between the electrodes and the electro-optic element of a proximity coupled electro-optic device, such as a multi-gate light valve for an electro-optic line printer, is filled with a dielectric having a relative dielectric constant (i.e., the dielectric constant relative to that of air) which is substantially greater than 1, thereby reducing the effective electrical thickness of the gap which, in turn, enhances the proximity coupling.

10 Claims, 8 Drawing Figures

DIELECTRIC INTERFACE FOR PROXIMITY COUPLED ELECTRO-OPTIC DEVICES

BACKGROUND OF THE INVENTION

This invention relates to electro-optic devices and, more particularly, to proximity coupled light valves for electro-optic line printers and the like.

It has been shown that an electro-optic element having a plurality of individually addressable electrodes can be used as a multi-gate light valve for line printing. See, for example, a copending and commonly assigned U.S. patent application of R. A. Sprague et al., which was filed June 21, 1979 under Ser. No. 040,607 on a "TIR Electro-Optic Modulator with Individually Addressed Electrodes." Also see "Light Gates Give Data Recorder Improved Hardcopy Resolution," *Electronic Design*, July 19, 1979, pp. 31–32; "Polarizing Filters Plot Analog Waveforms," *Machine Design*, Vol. 51, No. 17, July 29, 1979, p. 62; and "Data Recorder Eliminates Problem of Linearity," *Design News*, Feb. 4, 1980, pp. 56–57.

As is known, almost any optically transparent electro-optical material can be used as the electro-optic element of such a light valve. The most promising materials now appear to be $LiNbO_3$ and $LiTaO_3$, but there are other materials which qualify for consideration, including BSN, KDP, $KD^xP$, $Ba_2NaNb_5O_{15}$ and PLZT. In any event, the electrodes of such a light valve are intimately coupled to the electro-optic element and are distributed in non-overlapping relationship widthwise of the electro-optic element (i.e., orthogonally relative to its optical axis), typically on equidistantly separated centers so that there is a generally uniform interelectrode gap spacing. A copending and commonly assigned U.S. patent application of W. D. Turner, which was filed Sept. 17, 1980 under Ser. No. 187,936 on "Proximity Coupled Electro-Optic Devices", shows that the electrodes of an electro-optic device, such as a multi-gate light valve, may be fabricated on a suitable substrate and pressed against or held very close to the electro-optic element to provide what is referred to a "proximity coupling".

To perform line printing with a multi-gate light valve of the foregoing type, a photosensitive recording medium, such as a xerographic photoreceptor, is exposed in an image configuration as it advances in a cross line direction (i.e., a line pitch direction) relative to the light valve. More particularly, to carry out the exposure process, a sheetlike collimated light beam is transmitted through the electro-optic element of the light valve, either along its optical axis for straight through transmission or at a slight angle relative to that axis for total internal reflection. Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as "p-modulation" of the light beam) in accordance with the data samples applied to the electrodes as the light beam passes through the interaction region. Schlieren readout optics may be used to convert a phase front modulated light beam into a light beam having a correspondingly modulated intensity profile. For example, the phase front modulated light beam may be imaged onto the recording medium by central dark field or central bright field imaging optics. Alternatively, if the input light beam is polarized, a polarization modulation to intensity modulation conversion process may be performed by passing the polarization modulated output beam through a polarization analyizer. In more generic terms, the p-modulation of the light beam is converted into a correspondingly modulated intensity profile by using "p-sensitive readout optics" to image or project (hereinafter collectively referred to as imaging) the light beam onto the recording medium.

SUMMARY OF THE INVENTION

It has been found that proximity coupled electro-optic devices may require excessive drive voltages if the electric fields are coupled into the electro-optic element through an air gap. A gap is inherently present due to the surface roughness of the electrodes and the electro-optic element, possible defects in those surfaces, and entrapped dust particles. Indeed, it has been shown that the electrodes are advantageously mechanically gapped a predetermined nominal distance from the electro-optic element to reduce the deleterious effects of gap irregularities. See, a copending and commonly assigned U.S. patent application of R. A. Sprague et al., which was filed Sept. 17, 1980 under Ser. No. 187,918 on a "Mechanical Interface for Proximity Coupled Electro-Optic Devices."

Therefore, in accordance with this invention, the gap between the electrodes and the electro-optic element of a proximity coupled electro-optic device, such as a multi-gate light valve for an electro-optic line printer, is filled with a dielectric having a relative dielectric constant (i.e., the dielectric constant relative to that of air) which is substantially greater than 1. This increases the coupling efficiency and further reduces the adverse effects of any gap irregularties.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
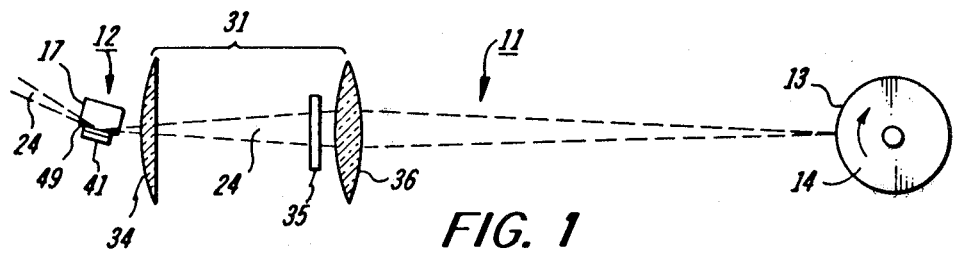
FIG. 1 is a schematic side view of an electro-optic line printer including a proximity coupled TIR multi-gate light valve which embodies the present invention.
Figure 2:
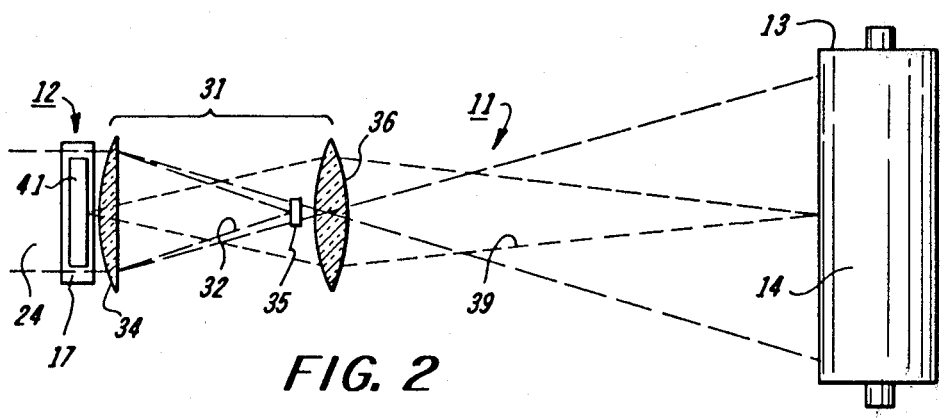
FIG. 2 is a schematic bottom plan view of the electro-optic line printer shown in FIG. 1.

Turning now to the drawings, and at this point especially to FIGS. 1 and 2, there is an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow. It nevertheless will be evident that there are other xerographic and non-xerographic recording media that could be used, including photoconductively coated xerographic belts and plates, as well as photosensitive film and coated paper in web or cut sheet stock form. The recording medium 13 should, therefore, be visualized in the generalized case as being a photosensitive medium which is exposed in an image configuration while advancing in a cross line or line pitch direction relative to the light valve 12.

Figure 3:
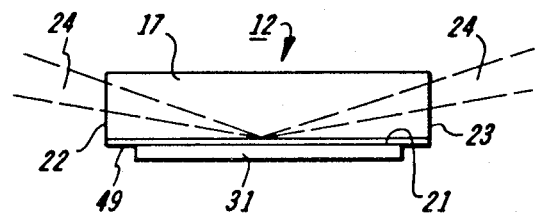
FIG. 3 is an enlarged side view of a TIR light valve for the electro-optic line printer of FIGS. 1 and 2.
Figure 4:
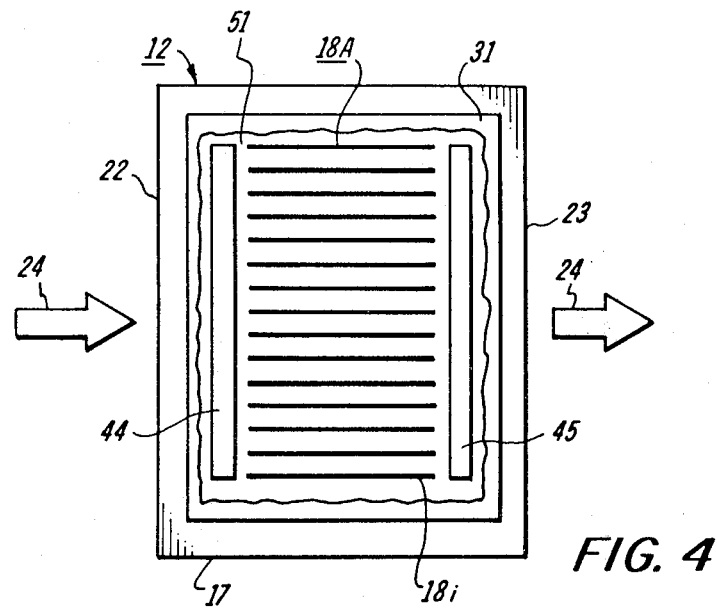
FIG. 4 is an enlarged cutaway bottom view of the TIR light valve of FIG. 3 showing a pattern of individually addressable electrodes and the rails which are provided to mechanically gap the electrodes from the electro-optic element in accordance with this invention.

As shown in FIGS. 3 and 4, the light valve 12 includes an electro-optic element 17 and a plurality of individually addressable electrodes $18a$–$18i$. For a total internal reflection (TIR) mode of operation as illustrated, the electro-optic element 17 typically is a y cut crystal of, say, $LiNbO_3$ having an optically polished reflecting surface 21 which is integral with and disposed between optically polished input and output faces 22 and 23, respectively. The electrodes $18a$–$18i$ are intimately coupled to the electro-optic element 17 adjacent the reflecting surface 21 and are distributed across essentially the full width thereof. Typically, the electrodes $18a$–$18i$ are 1-30 microns wide and are on centers which are more or less equidistantly separated to provide a generally uniform interelectrode gap spacing of 1-30 microns. In this particular embodiment the electrodes $18a$–$18i$ extend generally parallel to the optical axis of the electro-optic element 17 and have projections of substantial length along that axis. Alternatively, the electrodes $18a$–$18i$ could be aligned at the so-called Bragg angle relative to the optical axis of the electro-optic element 17. As will be appreciated, if the electrodes $18a$–$18i$ are aligned parallel to the optical axis of the electro-optic element 17, the light valve 12 will produce a diffraction pattern which is symmetrical about the zero order diffraction component. If, on the other hand, the electrodes $18a$–$18i$ are at the Bragg angle relative to the optical axis of the electro-optic element 17, the light valve 12 will produce an asymmetrical diffraction pattern.

Briefly reviewing the operation of the line printer 11 depicted in FIGS. 1-4, a sheet-like collimated beam of light 24 from a suitable source, such as a laser (not shown), is transmitted through the input face 22 of the electro-optic element 17 at a grazing angle of incidence relative to the reflecting surface 21. The light beam 24 is brought to a wedge shaped focus (by means not shown) at approximately the centerline of the reflecting surface 21 and is totally internally reflected therefrom for subsequent transmission through the output face 23. As will be seen, the light beam 24 illuminates substantially the full width of the electro-optic element 17 and is phase front modulated while passing therethrough in accordance with the differentially encoded data samples applied to the electrodes $18a$–$18i$.

Figure 5:
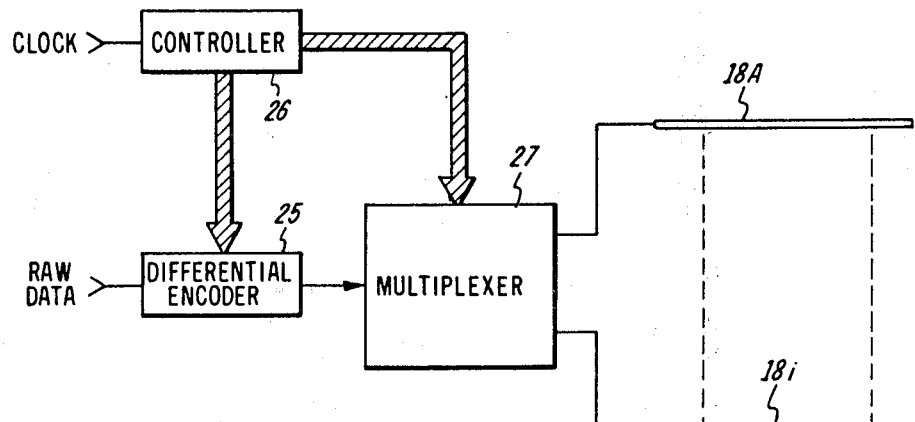
FIG. 5 is a simplified block diagram of a system for applying differentially encoded serial input data to the individually addressable electrodes of the electrode pattern shown in FIG. 4.

More particularly, as shown in FIG. 5, serial input data samples, which represent picture elements for successive lines of an image, are applied to a differential encoder 25 at a predetermined data rate. The encoder 25 differentially encodes the input samples on a line-by-line basis in response to control signals from a controller 26, and a multiplexer 27 ripples the encoded data samples onto the electrodes $18a$–$18i$ at a ripple rate which is matched to the data rate in response to further control signals from the controller 26. The input data may, of course, be buffered (by means not shown) to match the input data rate to any desired ripple rate. Additionally, the input data may be processed (by means also not shown) upstream of the encoder 25 for text editing, formatting or other purposes, provided that the data samples for the ultimate image are applied to the encoder 25 in adjacent picture element sequence. See, for example, a commonly assigned U.S. patent application of William Gunning et al., which was filed Apr. 5, 1978 under Ser. No. 893,658.

Differential encoding is described in substantial detail in a copending and commonly assigned U.S. patent application of W. D. Turner et al., which was filed Sept. 17, 1980 under Ser. No. 187,916 on "Differential Encoding for Fringe Field Responsive Electro-Optic Line Printers." Thus it will suffice to note that each differentially encoded data sample, other than the first sample for each line of the image, has a magnitude whose difference from the previous differentially encoded data sample corresponds to the magnitude of a respective input data sample. The first sample for each line of the image is referenced to a common reference potential, such as ground. Thus, all picture elements are faithfully represented by the electrode to electrode voltage drops that are produced in response to the differentially encoded data.

Figure 6:
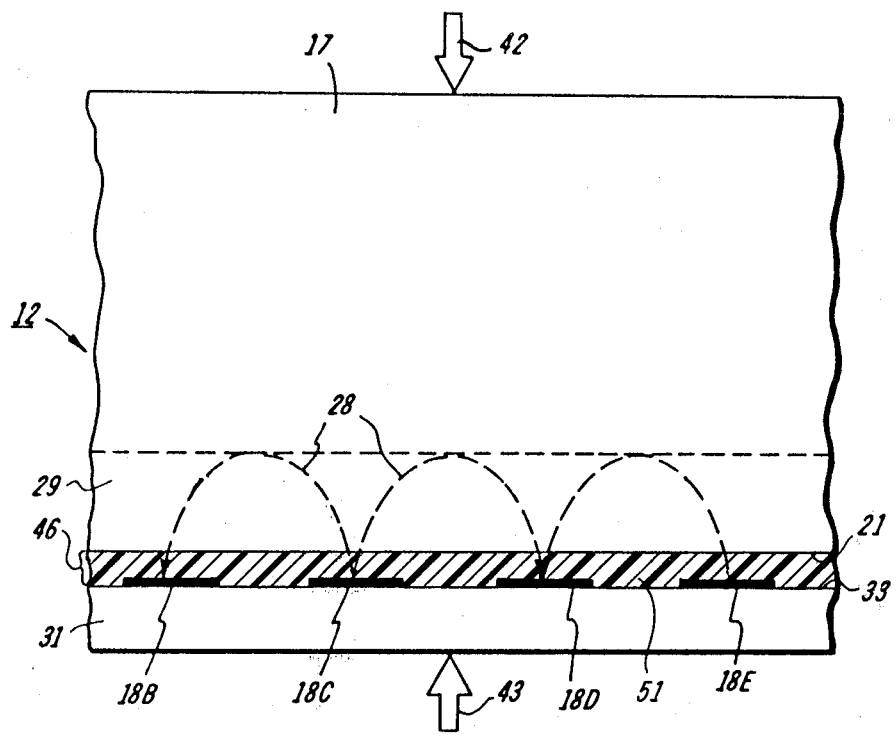
FIG. 6 is an enlarged and fragmentary sectional view of the TIR light valve shown in FIG. 3 to better illustrate the present invention.

Referring to FIG. 6, the electrode to electrode voltage drops create localized fringe fields 28 within an interaction region 29 of the the electro-optic element 17, and the fringe fields 28 cause localized variations in the refractive index of the electro-optic element 17 widthwise of the interaction region 29. The voltage drop between any adjacent pair of electrodes, such as $18b$ and $18c$ or $18c$ and $18d$, determines the refractive index for the portion of the interaction region 29 which bridges between those two electrodes. Hence, the refractive index variations within the interaction region 29 faithfully represent the input data samples appearing on the electrodes $18a$–$18i$ in differentially encoded form at any given point in time. It therefore follows that the phase front of the light beam 24 (FIG. 3) is sequentially spatially modulated in accordance with the data samples for successive lines of the image as the light beam 24 passes through the interaction region 27 of the electro-optic element 17.

Returning for a moment to FIGS. 1 and 2, to expose the recording medium 13 in an image configuration, there suitably are Schlieren central dark field imaging optics 20 which are optically aligned between the electro-optic element 17 and the recording medium 13 for imaging the light beam 24 onto the recording medium 13. The imaging optics 20 convert the spatial phase front modulation of the light beam 24 into a correspondingly modulated intensity profile and provide any magnification that is required to obtain an image of a desired width. To accomplish that, the illustrated imaging optics 20 include a field lens 34 for focusing the zero order diffraction components 40 of the phase front modulated light beam 24 onto a central stop 35 and an imaging lens 36 for imaging the higher order diffraction components onto the recording medium 13, i.e., the image plane for the light valve 12. The field lens 34 is optically aligned between the electro-optic element 17 and the stop 35 so that substantially all of the zero order components 40 of the light beam 24 are blocked by the stop 35. The higher order diffraction components of the light beam 24 scatter around the stop 35 and are collected by the imaging lens 36 which, in turn, causes them to fall onto the light valve image plane defined by the recording medium 13. Of course, other p-sensitive readout optics could be used to convert the phase front or polarization modulated light beam provided by the electro-optic element 17 into a light beam having a correspondingly modulated intensity profile.

To summarize, as indicated in FIG. 2 by the broken lines 39, each neighboring pair of electrodes, such as 18b and 18c (FIG. 6), cooperates with the electro-optic element 17 and with the p-sensitive readout optics 20 to effectively define a local modulator for creating a picture element at a unique, spatially predetermined position along each line of the image. Accordingly, the number of electrodes 18a–18i determines the number of picture elements that can be printed per line of the image. Moreover, by sequentially applying successive sets of differentially encoded data samples to the electrodes 18a–18i while the recording medium 13 is advancing in a cross line direction relative to the light valve 12, successive lines of the image are printed.

Figure 7:
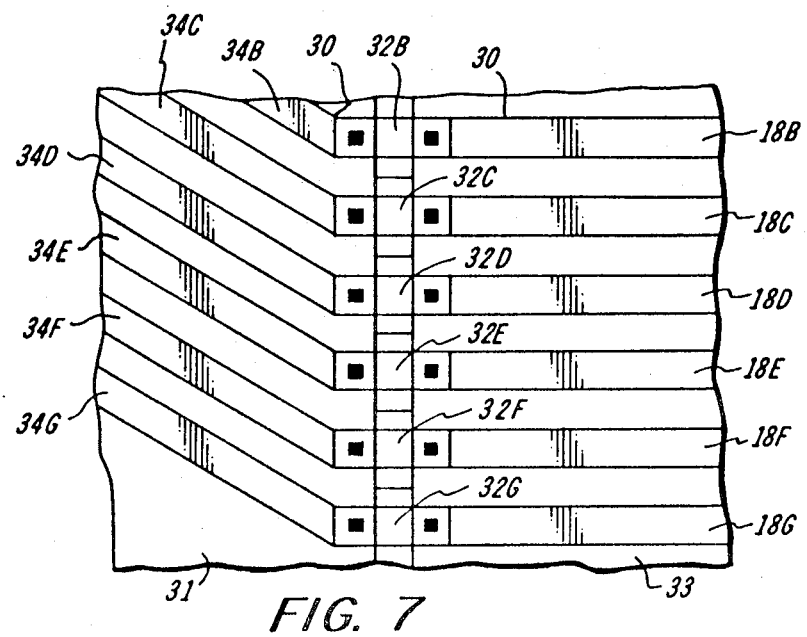
FIG. 7 is an enlarged and fragmentary schematic plan view of the electrode pattern of FIG. 4 as embodied on a silicon integrated circuit in accordance with this invention.

As best shown in FIG. 7, the electrodes 18a–18i are preferably defined by a suitably patterned, electrically conductive layer, generally indicated by 30, which is deposited on and is a part of an electrical integrated circuit 31, such as a LSI (large scale integrated) silicon integrated circuit, to make electrical contact to the integrated drive electronics 32b–32g. For example, as illustrated, the multiplexer 27 is embodied in the integrated circuit 31, and the electrodes 18a–18i are an extension of the metalization or polysilicon layer 30 which is used to make electrical connections to the output transfer gates or pass transistors 32b–32g and other individual components (not shown) of the multiplexer 27. The pass transistors 32b–32g and the other components of the multiplexer 27 are formed on the integrated circuit 31 by using more or less standard LSI component fabrication techniques, and the metalization or polysilicon layer 30 is thereafter deposited on the outer surface 33 of the integrated circuit 31. An etching process or the like is then used to pattern the electrically conductive layer 30 as required to provide electrically independent connections to the electrically independent components of the multiplexer 27 and to form the electrically independent electrodes 18a–18i (only the electrodes 18b–18g can be seen in FIG. 7). Thus, the data transfer lines 34b–34g for the pass transistors 32b–32g are defined in the metalization or polysilicon layer 30 by the same etching process which is used to define the electrodes 18a–18i.

Referring again to FIG. 6, the electrodes 18a–18i are proximity coupled to the electro-optic element 17. To that end, a clamp, which is schematically represented by the arrows 42 and 43, is engaged with the electro-optic element 17 and with the silicon integrated circuit 31 to urge the electrodes 18a–18i into close contact with the reflecting surface 23 of the electro-optic element 17. Alternatively, the integrated circuit 31 could be bonded to the electro-optic element 17 by an adhesive or by suction.

As shown in FIG. 4, to reduces the sensitivity of the light valve 12 to variations in the physical displacement of different points on the electrodes 18a–18i from the electro-optic element 17, there advantageously are rails 44 and 45 or similar spacers for mechanically maintaining the electrodes 18a–18i at a small predetermined nominal gap distance from the electro-optic element 17. The rails 44 and 45 are preferably located on opposite sides of the interaction region 27 of the electro-optic element 17 so that the interaction region 27 is free of pressure differentials which might cause undesireable piezoelectric effects. For example, as shown the rails 44 and 45 are formed on the electrode bearing integrated circuit 31 near its lead edge and trail edges, respectively, to engage the electro-optic element 17 forward and aft, respectively, of the interaction region 27. Alternatively, the rails 44 and 45 could be formed on the integrated circuit 31 near its front and back edges, respectively, to engage the electro-optic element 17 on opposite lateral sides of the interaction region 27. Still another alternative is to form the rails 44 and 45 on the electro-optic element 17 to engage the electrode substrate 31 either forward and aft or on opposite lateral sides of the electrodes 18a–18i. The interelectrode gap spacing of the electrodes 18a–18i must be sufficiently large compared to the nominal gap spacing provided by the rails 44 and 45 to ensure that the fringe fields 28 span the gap 46 and penetrate the electro-optic element 17 as previously described. For example, the rails 44 and 45 are each selected to have sufficient to provide a nominal gap 46 on the order of 0.10 microns if the interelectrode gap spacing is on the order of 5 microns. Of course, increased or decreased interelectrode gap spacings may require or permit a corresponding change in the heights of the rails 44 and 45.

In accordance with this invention, as depicted in FIG. 6, the gap 46 between the electrodes 18a–18i and the electro-optic element 17 is completely filled with a dielectric material 51 having a relative dielectric constant that is significantly greater than 1. The dielectric 51 may be a fluid which completely floods the gap 46 and which is confined therein by suitable seals (not shown). Or, the dielectric 51 may be a material, such as formvar or methyl methacralate, which can be loaded into the gap 46 while in a liquid state and then cured in situ into a solid state. Still another possibility is to use a finely divided solid dielectric which is dispersed in a suitable carrier. There is a $\sin^2$ relationship between the diffraction efficiency of the electro-optic element 17 and the strength of the fringe fields 28 created therein. Thus, the relative dielectric constant of the dielectric 51 is selected to be as high as possible to minimize the effective electrical thickness of the gap 46, thereby maximizing the coupling efficiency. It should, however, be noted that a marked increase in the coupling efficiency is realized, even if the dielectric 51 has a relative dielectric constant as low as 3 or 4.

The gap 46 provided by the rails 44 and 45 is a convenient cavity for accomodating the dielectric 51, but the dielectric interface provided by this invention is useful even if the is a relatively irregular gap (not shown) between the electrodes 18a–18i and the electro-optic element 17. Indeed on of the advantages of using the dielectric 51 as an interface between the electrodes 18a–18i and the electro-optic element 17 is that it reduces the effect of any gap irregularities on the relative strengths of the fringe fields 28 that are coupled into the electro-optic element 17 through such an irregular gap.

Figure 8:
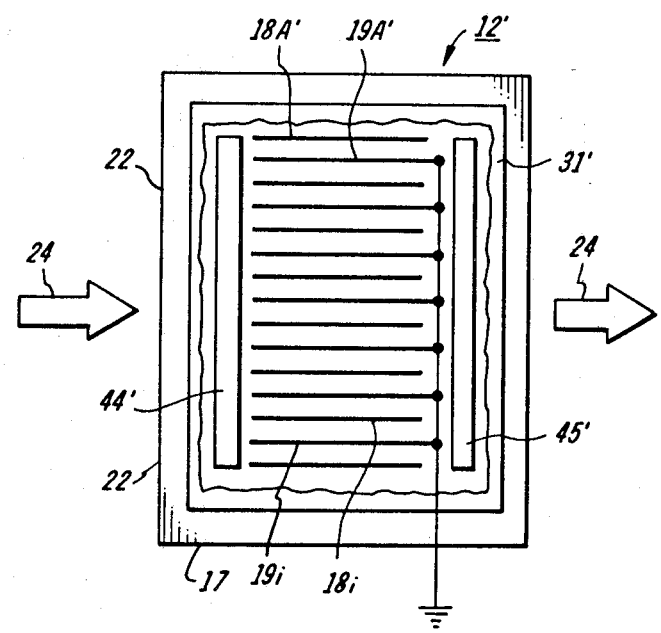
FIG. 8 is a enlarged cutaway bottom view of a TIR light valve having an alternative electrode pattern in combination with the mechanical gapping rails provided in accordance with this invention.

As shown in FIG. 8, the present invention may also be used to mechanically gap an alternating pattern of individually addressable electrodes $18a^1-18i^1$ and ground plane electrodes $19a^1-19i^1$ from the electro-optic element 17. As is known, such an electrode pattern may be used if the input data samples are not differentially encoded.

CONCLUSION

In view of the foregoing, it will be understood the dielectric interface provided by this invention improves the coupling efficiency of proximity coupled electro-optic devices, such as multi-gate light valves for an electro-optic line printers.

What is claimed is:

1. In an electro-optic device including
an electro-optic element,
a plurality of electrodes intimately coupled to said electro-optic element, and
means coupled to said electrodes for applying voltages thereto, whereby electric fields are created within said electro-optic element;
the improvement comprising
a substrate, at least one of said electrodes being supported by said substrate,
means engaged with said electro-optic element and with said substrate for maintaining said substrate supported electrodes within a small gap distance of said electro-optic element, thereby proximity coupling said substrate supported electrodes to said electro-optic element, and
a dielectric disposed within said gap, said dielectric substantially filling said gap and having a relative dielectric constant which is substantially greater than 1, whereby said dielectric enhances said proximity coupling.

2. The improvement of claim 1 wherein
all of said electrodes are supported on said substrate to create electric fringe fields within said electro-optic element in response to said voltages, and
further including spacer means disposed between said electro-optic element and said substrate to define said gap.

3. The improvement of claim 1 wherein
said substrate is an integrated circuit containing electronics for driving said substrate supported electrodes,
said integrated circuit has an electrically conductive layer for making electrical connections to said electronics, and
said conductive layer is patterned to define said substrate supported electrodes.

4. The improvement of claim 1 wherein
all of said electrodes are supported on said substrate, whereby said electrodes create electric fringe fields in an interaction region of said electro-optic element in reponse to said voltages.

5. The improvement of claim 4 wherein
said electro-optic device further includes means for transmitting a sheet-like collimated light beam through said electro-optic element,
said electrodes are spaced apart widthwise of said light beam,
at least every other one of said electrodes is independently addressable, and
said means for applying voltages to said electrodes includes means for cyclically applying respective data samples to said independently addressable electrodes, the data samples applied during any one of said cycles representing picture elements for a respective line of said image, and the data samples applied during successive cycles representing picture elements for successive lines of said image, whereby said fringe fields sequentially spatially modulate said light beam in accordance with the picture elements for successive lines of said image.

6. The improvement of claim 5 wherein
said electro-optic element has a reflective surface,
said light beam is applied to said electro-optic element at a grazing angle of incidence relative to said reflective surface, whereby said light beam is totally internally reflected from said reflective surface, and
said electrodes are proximity coupled to said electro-optic element adjacent said reflective surface, whereby said light beam interacts with said fringe fields as it approaches toward and recedes from said reflective surface, thereby causing said light beam to be spatially modulated in accordance with the data samples applied to said electrodes during each of said cycles.

7. The improvement of claim 6 wherein
said electro-optic element is an electro-optic crystal having an optically polished input face through which said light beam enters said crystal and an optically polished output face through which said light beam exits said crystal, and
said reflective surface is another optically polished face of said crystal which is disposed between said input face and said output face.

8. The improvement of claim 5 wherein
all of said electrodes are supported on said substrate to create electric fringe fields within said electro-optic element in response to said data samples, and
further including spacer means disposed between said electro-optic element and said substrate to define said gap.

9. The improvement of claim 8 wherein
said substrate is an integrated circuit containing electronics for applying said data samples to said electrodes,
said integrated circuit has an electrically conductive layer for making electrical connections to said electronics, and
said conductive layer is patterned to define said electrodes.

10. The improvement of claim 9 wherein
said electro-optic element is an electro-optic crystal having an optically polished input face, an optically polished output face, and an optically polished reflective surface disposed between said input face and said output face, and said light beam is applied to said electro-optic element at a grazing angle of incidence relative to said reflective surface, whereby said light beam is totally internally reflected from said reflective surface, and said electrodes are proximity coupled to said electro-optic element adjacent said reflective surface, whereby said light beam interacts with said fringe fields as it approaches toward and recedes from said reflective surface, thereby causing said light beam to be spatially modulated in accordance with the data samples applied to said electrodes during each of said cycles.

* * * * *